Patented Dec. 28, 1948

2,457,215

UNITED STATES PATENT OFFICE 2,457,215

GAS WELDING ROD

John Trimble Eash, Westfield, N. J., assignor to The International Nickel Company, Inc., New York, N. Y., a corporation of Delaware No Drawing. Application November 20, 1945, Serial No. 629,923. In Canada August 3, 1945

5 Claims. (Cl. 219—8)

The present invention relates to a welding rod or element particularly adapted for use in producing hard, wear-resistant, dense, gas-free welds and welded overlays.

In recent years, a large industry has developed concerned with the production of surfaces with higher resistance to wear and abrasion than the base or foundation structures which support the hard surface material. Mining machines, excavating machines, crushers, grinders, rolls and other mechanical equipment which must have high tensile and impact strengths have been provided with cutting, digging or bearing surfaces which possess considerably higher resistance to abrasion than the core metal upon which the wearing surface is deposited.

It has also been found advantageous to repair or replace the surfaces of parts of machines subjected to excessive wear with a coating possessing a very high Brinell hardness after the original surface has been destroyed by abrasion or similar action, but before the entire machine has failed. In this manner, the useful life of mechanical shovel buckets, drag-line bucket teeth, and similar parts of many pieces of mechanical equipment has been extended with appreciable savings to the operators thereof.

It is well known in the art that difficulty is encountered in producing in a practical manner, dense gas-free overlays possessing high hardness. For a satisfactory overlay, the surface and the internal structure must be substantially non-porous, dense and gas-free. The materials from which the overlays are produced must be easily workable, with no slag interference or with a very small amount of self-floating slag. The penetration of the overlays into the base must be such that the metallic deposit adheres firmly and tenaciously to the base. The overlay must be tough as well as hard to ensure that the coating will not spall off. The appearance of the finished overlay must be bright and clean and free from any occlusions of slag, etc.

U. S. Patent No. 2,184,518 granted to applicant Eash and another discloses and claims a gas welding rod containing calcium and lithium which, from a technical consideration of the overlays produced and the welding characteristics of the rod, has provided a satisfactory solution to the various problems outlined hereinbefore and others encountered in producing the hard, wear-resistant, dense, gas-free overlays. However, this prior weld rod has several disadvantages from a manufacturing standpoint. The weld rod disclosed and claimed in U. S. Patent No. 2,184,518 provides a method for depositing hard, wear-resistant, dense, gas-free overlays produced by incorporating a 50/50 or similar calcium-lithium alloy in nickel-chrome cast iron melts. The difficulties involved in producing such a nickel-chromium-cast iron melt containing calcium and lithium are many.

For example, lithium is very volatile and its vapors are obnoxious to workmen. Because of their high affinity for oxygen, the calcium-lithium alloys for use in the cast must be kept submerged in kerosene to prevent spontaneous oxidation. This introduces a hazard in making the melt since it is necessary to completely remove the kerosene before adding the lithium-calcium alloy to the melt, and this complete removal of the kerosene is difficult.

In addition, although the prior weld rod described in U. S. Patent No. 2,184,518 has certain economic advantages over weld rods disclosed prior to the Eash and Wood weld rod, nevertheless, the Eash-Wood weld rod suffers from certain economic disadvantages due to the high cost of the calcium-lithium alloy, which is considerably higher than other calcium alloys.

For the foregoing reasons, it is manifest that it is highly desirable to improve prior art weld rods and particularly the Eash-Wood weld rod to overcome these disadvantages.

It has been discovered that a gas welding rod having all the advantages of the Eash and Wood welding rod and none of its disadvantages can be produced by employing calcium silicide or other metallic, lithium-free sources of calcium, such as calcium metal or calcium metal plus ferrosilicon, rather tran the expensive calcium-lithium alloy. Any available form of calcium-silicon alloys may be employed. These alloys, which are generally referred to as calcium silicide, usually contain about 20% to 40% calcium and 80% to 60% silicon with small amounts of impurities.

It is an object of the present invention to provide nickel-chrome welding rods containing sufficient calcium to produce sound, dense welds and overlays.

It is another object of the present invention to provide lithium-free nickel-chromium cast iron welding rods or elements of suitable composition for depositing dense, gas-free surfaces of high Brinell upon steel and iron surfaces.

It is a further object of the present invention to provide a calcium-containing lithium-free welding rod capable of use for depositing a plurality of dense, gas-free nickel-chromium cast iron coatings of high Brinell hardness upon massive steel and iron articles.

The present invention also contemplates the provision of lithium-free nickel cast iron welding rods or elements substantially devoid of protective coatings and suitable for use in depositing metallic overlays having especially high Brinell hardness and being dense and gas-free and adhering tenaciously to the base.

It is also within the scope of the present invention to provide chill-cast nickel cast iron welding rods substantially devoid of protective coatings suitable for use in depositing metallic overlays having especially high Brinell hardness and being dense and gas-free and adhering tenaciously to the base.

An early attempt was made to provide a satisfactory cast welding rod by incorporating metallic calcium in a nickel-chromium-cast iron melt. This was unsatisfactory because the correct melting technique was not employed in making the heat. It has subsequently been found necessary in making the lithium-free rod to follow a definite melting procedure including the superheating of the liquid bath as described herein. When this procedure is followed, satisfactory nickel-chromium-cast iron rods containing calcium can be made that will produce sound, dense overlays and welds, i. e., deposits.

It has now been discovered that if calcium is added as a lithium-free metallic agent, for example in the form of a calcium-silicon alloy, a satisfactory weld rod can be obtained provided the melt is superheated and then chill cast or cast in sand and ground to remove any sand that may be adhering to the surface of the rod. The presence of relatively few grains of silica in the outer skin of the weld rod is sufficient to produce unsatisfactory results. That is to say, if a nickel-chromium cast iron weld rod, to which calcium-silicon alloy or other lithium-free metallic calcium-containing agent has been added in an amount sufficient to provide a satisfactory calcium content, is sand cast, unsatisfactory results are obtained if the rod is used with the as-cast surface. Silica adhering to the surface of the rod interferes with the flow of the liquid overlay during welding and forms an oxide film on the surface which decreases the wetting or bonding of the overlay on the base material. As a result, the overlay will contain slag inclusions and will be porous, and have poor wearing characteristics. However, if such a sand cast rod is then treated, for example by grinding or the like, to remove the particles of silica picked up from the sand mold and carried by the outer layer of the weld rod, satisfactory overlays can be deposited.

It is, however, preferred to chill cast the lithium-free weld rods of the present invention since several advantages arise therefrom. That is to say, the chill cast rods of the present invention are far tougher than the sand cast rods. They can be handled with much less care in transit and storage without breaking than can the sand cast weld rod. Furthermore, the chill cast lithium-free nickel-chrome cast iron weld rod can be bent into almost any shape necessary to reach the most inaccessible places upon which is to be deposited a wear-resistant, dense, gas-free overlay of high Brinell hardness, whereas the sand cast rods are brittle and unable to stand such bending.

The chill-cast weld rod of the present invention provides a rod of greater toughness than the prior art nickel-chromium-cast iron rods.

It is an essential feature of the present invention that the melt to which the calcium or calcium silicide is to be added be subjected to a superheating treatment prior to the addition of the calcium silicide. The superheating treatment comprises heating the metal to a temperature of at least 2850° F. to about 3000° F. and preferably to a temperature of about 2900° F. The metal after superheating is cooled to about 2800° F. or lower, for example as low as about 2600° F., and the calcium-containing agent, for example calcium silicide, is added. This reduction of temperature after the superheating treatment and prior to the addition of the calcium or calcium-containing agent is preferred in order to avoid the excessive losses of calcium from the treating agent that would be encountered if the addition was made at the superheating temperature. After the addition of the calcium or calcium-containing agent it is preferred that the melt be further cooled to a temperature of about 2500° F. to 2700° F. at which temperature it may be poured or cast, preferably chill-cast as hereinbefore recited. While it is not an essential feature of the present invention, it is preferred that melts produced in accordance with the foregoing procedure be made under a slag, for example, a slag of powdered glass.

The amount of calcium which may be added to the melt may be within a range of 0.05% to 1.0% and preferably within a range of 0.2% to 0.5%. An amount of calcium equivalent to the maximum solubility of calcium in the melt may be used. The residual amount of calcium in the finished rod will generally not exceed 0.1%.

It will be apparent from the foregoing that the invention in its broad aspect contemplates the addition of a calcium-containing agent to a melt of suitable composition after first heating the melt to a preferred temperature of superheat, the addition being made at a temperature somewhat below the temperature of superheat, reducing the temperature of the calcium-containing melt to a temperature below the temperature of calcium addition and chill casting the melt so obtained, and producing hard, dense, gas-free deposits from the welding rods so produced.

The improved lithium-free rods are made by melting a charge of nickel-chromium cast iron, heating the charge to between 2850° to 3000° F., e. g. about 2900° F., adding a calcium-silicon alloy or other metallic lithium-free calcium-containing agent in an amount sufficient to introduce about 0.05% to 1%, for example, about 0.3%, calcium into the charge and casting the melt, preferably in chill molds, for example, graphite molds. The rods so produced are tough and when overlays are deposited with a slightly reducing oxyacetylene flame, the welds so produced are dense, gas-free and have high hardness.

Suitable rods can be produced by adding an amount of a calcium-silicon alloy to provide about 0.05% to 1% calcium to a base charge having a composition within the following range:

| Composition | Per cent |
|---|---|
| Carbon | 2.00 to 4.00 |
| Silicon | 0.25 to 2.00 |
| Nickel | 2.00 to 7.00 |
| Chromium | 0.25 to 3.00 |
| Manganese | 0.1 to 1.50 |
| Phosphorus | Max. .30 |
| Sulfur | Max. .20 |
| Iron | Balance |

When the maximum amount of silicon given in the table is employed, the carbon content is preferably near 2%, i. e., approximating the minimum; likewise when the silicon content is low the carbon content is preferably near the maximum specified. Other elements such as molybdenum, tungsten, vanadium, etc. may be present in small amounts with beneficial results in some instances as those skilled in the art will understand.

Specific examples for a suitable charge to produce the novel calcium-containing lithium-free weld rod of the present invention are the following:

*Example 1*

The charge had the following composition:

| Composition | Per Cent |
|---|---|
| Carbon (Total) | 3.68 |
| Silicon | 1.10 |
| Manganese | 0.60 |
| Nickel | 4.50 |
| Chromium | 1.6 |
| Phosphorus | Max. 0.20 |
| Sulfur | Max. 0.10 |
| Calcium | 0.3 |
| Iron | Balance |

The foregoing composition represents the final charge to which the calcium has been added. This final charge was prepared by the following procedure: The recited percentage of ingredients, without the calcium and with only 0.5% silicon was melted in an induction furnace. The melt was heated to about 2900° F., was then cooled to about 2800° F. and sufficient 31% calcium-69% silicon alloy was stirred into the melt to provide about 0.3% calcium in the charge. This addition raised the silicon content to about 1.1%. The calcium-containing, lithium-free charge was then poured into a machined graphite chill mold. Using the welding rods produced by the foregoing procedure in welding on steel plates, utilizing a slightly reducing oxyacetylene flame, provided sound, dense gas-free overlays having a hardness as indicated in the following tabulation:

| Rod No. | Composition of Rod | | | | | Vickers Hardness of Weld on Steel Plate |
|---|---|---|---|---|---|---|
| | Total C | Si | Mn | Ni | Cr | |
| 1 | 3.50 | 1.00 | 0.50 | 4.50 | 1.60 | 684 |
| 2 | 3.50 | 1.00 | 0.50 | 4.50 | 1.60 | 624 |

*Example 2*

The charge for Example 2 was similar to that of Example 1 except that the calcium was added to the charge as calcium metal together with an amount of ferro-silicon. The charge, including the added calcium and ferro-silicon, was:

| Composition | Per Cent |
|---|---|
| Carbon (total) | 3.68 |
| Silicon (including that in the ferro-silicon) | 1.10 |
| Manganese | 0.60 |
| Nickel | 4.50 |
| Chromium | 1.60 |
| Phosphorus | Max. 0.20 |
| Sulfur | Max. 0.10 |
| Calcium | 0.30 |
| Ferro-silicon | 0.75 |
| Iron | Balance |

The procedure was similar to that of Example 1, with heating of the charge to about 2900° F. followed by cooling to about 2800° F., followed by the addition of the calcium and ferro-silicon. The charge was then poured into a machined graphite chill mold.

The essentiality of superheating in accordance with the methods of the present invention, in addition to the inclusion of calcium in the melt, is clearly demonstrated in the following experimental data:

(a) A melt, such as in Example 1, was heated to 2730° F. and calcium silicide, in an amount sufficient to introduce 0.3% calcium, was added at that temperature (2730° F.). Chill cast welding rods obtained from the foregoing melt were used in welding and the welds so produced were porous and contained many gassy, bright surface blow holes. It was thought that the bright surface of the blow holes indicated the presence of a reducing gas such as hydrogen.

(b) A second melt was made endeavoring to eliminate any reducing gas that might be present. A melt similar to that of Example 1 was made and was heated to 2750° F. An amount of iron oxide ($Fe_2O_3$) was added to the melt to oxidize any occluded reducing gas such as hydrogen. 0.3% of calcium as calcium silicide was then added to the melt while maintaining the temperature at 2750° F. and the melt was then allowed to cool to 2650° F. and was cast. Welds made from the rods so produced contained numerous blow holes. This experiment demonstrated that whatever caused the blow holes could not be removed by adding an oxidizing agent such as iron oxide.

(c) A further experiment, similar to (b), was conducted using the superheating technique of the present invention. The melt was heated to 2910° F. and was then cooled to 2810° F. The iron oxide was added and then the calcium silicide while the melt was at 2810° F. The melt was then allowed to cool to 2650° F. and was chill cast as welding rods. Welds made with the rods so produced were sound and dense and devoid of gas holes.

It will be apparent from the foregoing experimental data that the inclusion of a calcium-containing agent, with or without the addition of a material adapted to oxidize any occluded reducing gas that may be present, is not sufficient to produce the dense, gas-free overlays which are provided by the use of applicant's novel welding rod and that these novel results are attained only where the welding rods used are those produced by applicant's novel method in which the calcium-containing agent is introduced into a superheated melt.

It will also be apparent from the foregoing experimental data that welding rods produced according to the present invention and welds produced when using these welding rods provide a considerable improvement over the welding rods and welds produced according to the prior art,

I claim:

1. A lithium-free welding rod adapted for producing dense, hard, gas-free deposits by gas flame welding comprising about 3.5% carbon, 1.0% silicon, 0.50 manganese, 4.50% nickel, 1.60% chromium, phosphorus and sulfur not in excess of 0.20% and 0.10%, respectively, and the balance essentially iron but including the maximum amount of calcium soluble in a melt of the foregoing ingredients when said melt is superheated prior to the introduction of said calcium thereto, the said welding rod being substantially devoid of adhering particles of silica and the like.

2. A lithium-free welding rod adapted for producing dense, hard, gas-free deposits and overlays by gas flame welding, said welding rod being cast in a graphite chill mold from a melt comprising from 2.0% to 4.0% carbon, 0.25% to 2.0% silicon, 2.0% to 7.0% nickel, 0.25% to 3.0% chromium, 0.1% to 1.50% manganese, phosphorus and sulfur in amounts not exceeding 0.30% and 0.20%, respectively, and the balance essentially iron but containing an amount of calcium approximately the amount of maximum solubility of calcium in said melt when said melt is superheated prior to the introduction of said calcium thereto.

3. A method of producing welding rods which comprises melting a charge of nickel-chromium cast iron, superheating said melted charge to a temperature of about 2850° F. to about 3000° F., cooling said charge to a temperature of about 2800° F. to about 2600° F., adding a metallic lithium-free calcium-containing agent in an amount sufficient to introduce about 0.05% to about 1.0% calcium uniformly into said melt and casting said melt in a welding rod mold having a casting surface devoid of releasable silica-containing particles.

4. A method for producing welding rods adaptable for use in forming dense, hard, gas-free deposits on a base metal which comprises forming a melt containing about 2.0% to about 4.0% carbon, about 0.25% to about 2.00% silicon, about 2.00% to about 7.00% nickel, about 0.1% to about 1.50% manganese, about 0.25% to about 3.00% chromium, phosphorus and sulfur in amounts not exceeding 0.30% and 0.20%, respectively, and the balance iron, superheating said melt to a temperature of about 2900° F., cooling said melt to a temperature of about 2800° F., stirring about 0.30% calcium in the form of a calcium-silicide alloy into said melt and casting said calcium-containing charge in a machined graphite chill welding rod mold.

5. A method of producing welding rods adaptable for use in forming dense, hard, gas-free deposits on a base metal which comprises melting a charge containing about 2.0% to about 4.0% carbon, about 0.25% to about 2.0% silicon, about 2.0% to about 7.0% nickel, about 0.1% to about 1.5% manganese, about 0.25% to about 3.0% chromium, phosphorus and sulphur in amounts not exceeding 0.30% and 0.20% respectively, and the balance iron; superheating said melted charge to a temperature of about 2850° F. to about 3000° F., cooling said charge to a temperature of about 2800° F. to about 2600° F., adding a metallic lithium-free calcium-containing agent in an amount sufficient to introduce about 0.05% to about 1.0% calcium uniformly into said melt, and casting said melt in a welding rod mold.

JOHN TRIMBLE EASH.

REFERENCES CITED

The following references are of record in the file of this patent:

UNITED STATES PATENTS

| Number | Name | Date |
|---|---|---|
| 2,209,519 | Halbrock et al. | July 30, 1940 |
| 2,249,629 | Hopkins | July 15, 1941 |
| 2,306,421 | Anress | Dec. 29, 1942 |

Certificate of Correction

Patent No. 2,457,215.  December 28, 1948.

JOHN TRIMBLE EASH

It is hereby certified that errors appear in the printed specification of the above numbered patent requiring correction as follows:

Column 2, line 41, for "tran" read *than*; column 7, line 31, claim 2, for the syllable "proximately" read *proximating*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*